United States Patent [19]

Dahle

[11] 4,070,614
[45] Jan. 24, 1978

[54] MAGNETOELASTIC SHAPE METER FOR COLD-ROLLED STRIPS OF FERROMAGNETIC MATERIAL

[75] Inventor: Orvar Dahle, Vasteras, Sweden

[73] Assignee: Asea Aktiebolag, Vasteras, Sweden

[21] Appl. No.: 651,466

[22] Filed: Jan. 22, 1976

[30] Foreign Application Priority Data

Jan. 24, 1975 Sweden .................................. 7500751

[51] Int. Cl.$^2$ ............................................ G01R 33/12
[52] U.S. Cl. ................................ 324/209; 73/DIG. 2
[58] Field of Search .......................... 324/34 R, 34 ST; 73/DIG. 2, 133, 88.5, 144

[56] References Cited

U.S. PATENT DOCUMENTS

| | | | |
|---|---|---|---|
| 2,057,835 | 10/1936 | Karajan et al. | 324/34 TK |
| 3,311,818 | 3/1967 | Quittner | 324/34 ST |
| 3,711,766 | 1/1973 | Dahm | 324/34 ST |
| 3,798,537 | 3/1974 | Dahm | 324/34 ST |
| 3,969,668 | 7/1976 | Weinzinger et al. | 324/34 R |

*Primary Examiner*—Robert J. Corcoran

*Attorney, Agent, or Firm*—Watson, Cole, Grindle & Watson

[57] ABSTRACT

In ordr to measure deformations of magnetic material which is being cold-rolled a plurality of magnetoelastic stress-sensing transducers are used, each of which has two U-shaped magnetic cores provided with windings and crossing each other perpendicularly. The cores are mounted with their pole surfaces spaced from the strip being rolled and with the cores making an angle of 45° with the longitudinal direction of the strip. The individual transducers are screened from each other by a screen of magnetic material positioned axially symmetrically around each transducer, so as to prevent adjacent transducers from magnetically affecting each other except through the field in the measuring object and the leakage field in the air gap between the measuring device and the object. The transducers are mutually displaceably arranged along a line crosswise of the strip. Between the transducers and the measuring object there is a protective plate of non-magnetic material with very high resistivity.

2 Claims, 7 Drawing Figures

MAGNETOELASTIC SHAPE METER FOR COLD-ROLLED STRIPS OF FERROMAGNETIC MATERIAL

BACKGROUND OF THE INVENTION

1. Field of the Invention

The invention relates to a shape meter for measuring deformations in sheets of magnetic material during cold-rolling.

In the cold rolling of thin metal strips, the strip may appear quite flat when being rolled up on the coil under high tensile stress, even if, during the subsequent recoiling under low tensile stress, it displays local waviness either at the edges or in the middle, but mainly at the edges. In the latter case, with edge waves having the wave length L, these are apparently longer than the flat middle portion of the same sheet, and the relative length difference $\Delta L/L$ is a measure of the off-flatness.

Since the tensile stress in the strip in a cold rolling mill is usually so high between the last roll pair and the coil that the strip at that point is quite flat, the length difference $\Delta L/L$ is transformed into a stress difference $\Delta \sigma = E(\Delta L/L)$, where E is the modulus of elasticity of the strip material. If $\Delta \sigma$ can be measured when the strip is tautly stretched, it will be possible to calculate the off-flatness of the material in the free condition.

In magnetic materials the distribution of the stresses can be measured in a strip which is elastically flattened under tensile stress by utilizing the magnetic anisotropy generated in the strip by the tensile stress. In material with positive magnetostriction, such as steel at a moderate magnetization, the permeability increases in the drawing direction and decreases in the cross-direction.

This anisotropy can be sensed in a contact-free manner by means of a transducer of the type shown and described in U.S. Pat. No. 2,912,642. Such a transducer comprises two iron cores arranged perpendicularly to each other and provided with windings, one of the iron cores being excited by alternating current and inducing a magnetic field in the measuring object and the other one sensing the asymmetry in the field caused by the tensile stress.

2. The Prior Art

Attempts with magnetoelastic strip shape measuring have been carried out in several places, and in most cases a number of transducers according to the above-mentioned patent have been used placed in a row across the strip. In all cases, even when transducers of somewhat different types have been used, the individual transducers have been screened by casing of non-magnetic material, and a strong magnetic coupling has been obtained between them. This coupling has resulted in a large zero displacement but, since the transducers have had fixed mutual positions, it has been possible to compensate for this zero displacement.

When measuring the shape of a strip, the stress in a relatively narrow zone at each edge of the strip is of special interest. Using a row of stationary transducers, these edge zones can be sensed only in exceptional cases. At times, therefore, only one single transducer has been used running back and forth on guides across the strip, thus obtaining a consecutive sensing of all strip zones. Besides the obvious disadvantage with a movable arrangement with a flexible lead-in cable, which is in constant motion and is rapidly worn, very sparse information is obtained from each zone at high speeds of the strip. Consequently, a considerable amount of strip with bad shape may have time to pass before any correcting manual or automatic measures can be taken.

SUMMARY OF THE INVENTION

With the present invention, the above-mentioned difficulties have been removed. The invention relates to a device with a number of magnetoelastic transducers of the type mentioned previously, or a similar type, arranged mutually displaceably in a line across the strip. In order to prevent the change in the distance between the transducers from giving rise to changes in the zero signals, which is particularly harmful at the outermost transducers which are changed differently from the others, the individual transducers are screened from each other by means of axially symmetrical casings of magnetic material. Only the side of the transducers facing the measuring object, where the poles of the transducers are located, is unscreened.

With this screening, the transducers can be placed quite close to each other with no other mutual influence than what is obtained through the field in the measuring object and the leakage field in the air gap between the measuring device and the measuring object. These latter disturbances can be reduced to a negligible level by rotating every second transducer 90° around its symmetry axis in relation to the adjacent transducers.

When the mutual influence between the transducers has been eliminated, the transducers can be distributed arbitrarily along the line across the strip. It is particularly important that transducers can be placed in optimum position below the above-mentioned, important edge zones. It is particularly advantageous to be able to control the transducers mechanically, so that they are always at equally great distances from each other. In this connection there are suitably used an odd number of transducers and the central transducer is held fixed. The even distribution of the transducers during a variation of the measurement width can be achieved by means of a multiple pantograph arrangement. Another possibility of providing mutually equal distances between the transducers is to apply mutually equal spring elements between the different transducers and expand the arrangement to the desired width.

To prevent magnetic particles from adhering to the transducer poles and disturbing the measurements, and to protect the transducers mechanically in the event of strip rupture, it is appropriate to apply a protective plate between the transducers and the strip which is to be controlled. This plate must, of course, be of non-magnetic material, but this is not sufficient. If, for example, brass or bronze is used as the plate material, a strong eddy current coupling is obtained between the different transducers, which makes measuring impossible. It is therefore necessary to employ material with a resistivity which is many times higher, for example austenitic stainless steel or a material known under the name INCONEL. In this way a disturbing eddy current coupling between the transducers is prevented.

BRIEF DESCRIPTION OF THE DRAWINGS

In the accompanying drawings.

DESCRIPTION OF THE PREFERRED EMBODIMENTS

Figure 1:
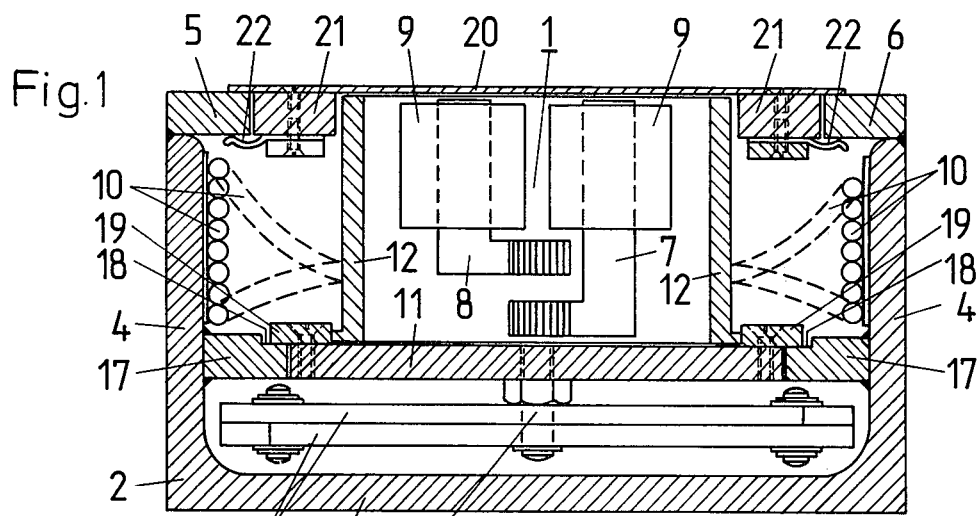
FIG. 1 shows a cross-section through a transducer of the shape meter.
Figure 2:
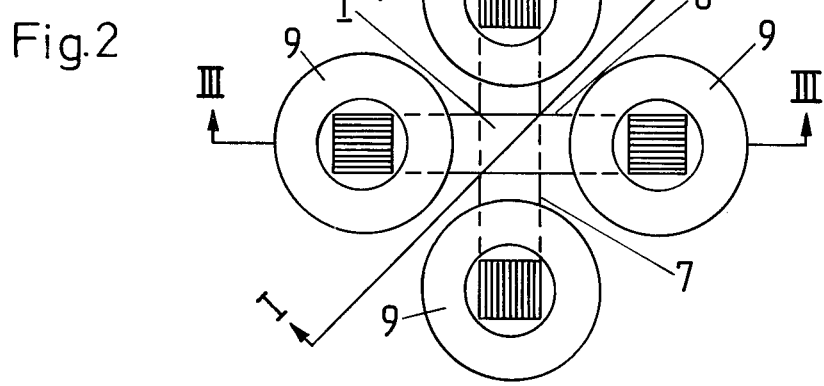
FIG. 2 shows a top view of a transducer used in the meter.
Figure 3:
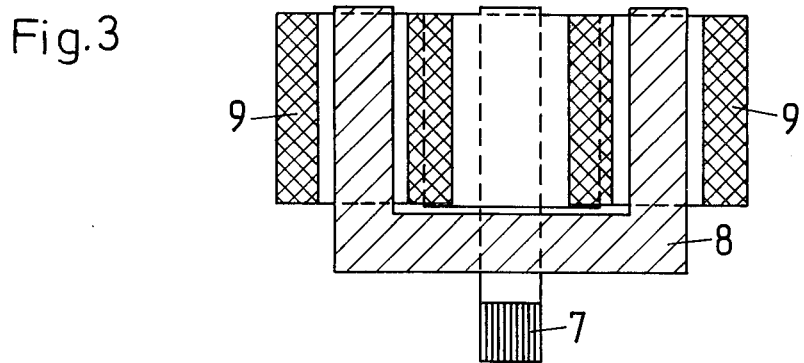
FIG. 3 is a cross-section along the line III—III in FIG. 2.

The shape meter is enclosed in an elongated box-shaped beam 2 which, according to FIG. 1, consists of a bottom 3, two side pieces 4 and two flanges 5 and 6 facing each other from the upper ends of the side pieces. The meter contains a number of magnetoelastic transducers 1 according to U.S. Pat. No. 2,912,642, consisting of two U-shaped magnetic cores 7 and 8, each provided with windings 9, as shown in FIGS. 1, 2, and 3. The cores are arranged perpendicularly to each other and may be completely separated or joined to each other at the crossing point, the windings being placed at the parallel branches of the cores. The windings on one core are connected to an alternating voltage source, whereas the windings on the other core are connected to a measurement device. The transducer is described in detail in the above-mentioned patent and the description thereof is incorporated herein by reference.

Figures 4, 5, 6:
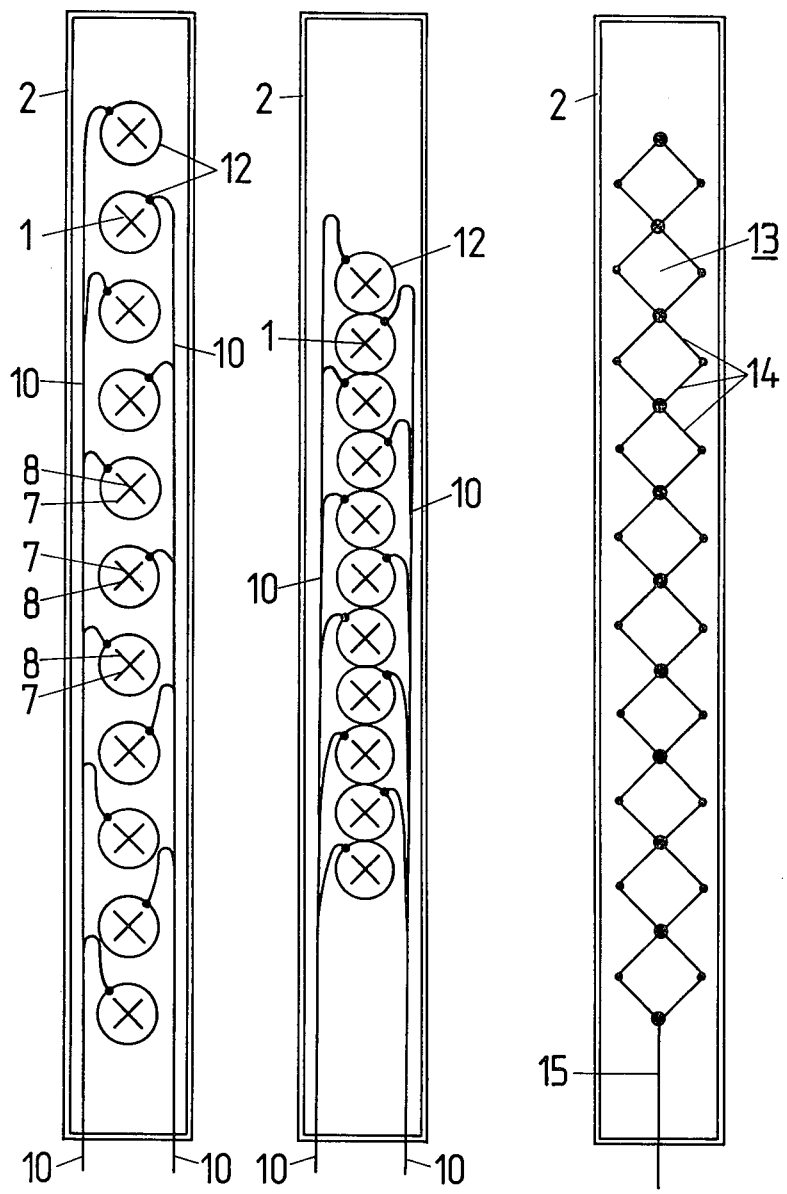
FIG. 4 is a schematic top view of the meter, the transducers being spread out.
FIG. 5 is a top view with the transducers close together.
FIG. 6 shows a device for moving the transducers to different positions.

FIG. 4 shows how a number of transducers are arranged at equal distances from each other in the box-shaped beam 2. The transducers are oriented so that the yokes of the cores make an angle of 45° with respect to the longitudinal direction of the beam. Furthermore, every second transducer is rotated 90° with respect to the two adjacent transducers, which is shown in the middle of FIG. 4. By this alternate rotation of the transducers, the mutual magnetic influence between the transducers, which is obtained through the measuring object and the leakage field in the air gap between the measuring device and the measuring object, is reduced. The windings of the transducers are connected by means of cables 10 to the alternating voltage source and the measuring devices, respectively, the cables being alternately led in separate directions since every second transducers, because of the 90° rotation, should be pole-reversed primarily or secondarily in order for the output signals to have the same signs.

Each transducer is mounted on a plate 11 and surrounded by a screen 12 of magnetic material. The screen is shown in FIGS. 4 and 5 as a cylindrical casing, but other shapes of the casing may be used. The screen is attached to the plate 11 on which the transducer is mounted and constructed so that the plate 11 and the screen 12 surround the transducer completely except on the side facing upwards towards the measuring object.

In order to be able in a simple manner, and with an unchanged number of transducers, to use the meter for measuring on strips of different widths, the transducers are mounted on a device for spreading or collecting the transducers with maintained mutually equal distances between the transducers. FIG. 6 shows one of many feasible ways of achieving this. It is then suitable to fix the central transducer to the beam, and to make the transducers arranged on either side of the fixed transducer each movable in their own directions. This definite movability is achieved by a pantograph-like construction 13, consisting of a number of rods 14 which, in a known manner, are articulatedly joined to each other in pairs at the middle and ends of the rods. By means of a draw rod 15 attached at one end of the pantograph system, all the transducers are acted on so that they move either towards or from each other, the distances between the individual transducers always being the same everywhere. The transducers are attached to the center of two rods crossing each other, for example by means of a bolt 16 as will be seen in FIG. 1.

The transducers are controlled so as to move rectilinearly within the beam by attaching one bar 17 at each side piece 4 so that a slot is formed between the free side edges of the two bars, in which slot the plates 11 are able to run. The plates 11 with transducers 1 mounted thereon are supported by the bars 17 by the fact that a slot 18 is provided at the upper side of the bars, in which slot 18 blocks 19 fastened to the upper side of the plate 11 are able to slide.

The upwardly open, box-shaped beam 2 is covered by a removable lid consisting of a plate 20 of a material with a very high resistivity, for example austenitic stainless steel or a similar material. On its under side the plate supports two strips 21 which, when the plate is in position, shown in FIG. 1, is positioned close to the edges of the two flanges 5, 6 facing each other. In this way the lid is controlled in the lateral direction. Two elongated springs 22 may be attached to the under side of the strips 21 to prevent the lid from moving upwards. Since the plate 20 extends out on the flanges 5 and 6 and since the springs 22 make contact with the under sides of the flanges 5 and 6, the lid will move parallel to the beam 2 only in its longitudinal direction. The object of the lid is to prevent magnetic particles from adhering to the free pole surfaces of the transducer cores, but it also constitutes a sealing lid on the beam to prevent contamination of the interior of the beam and also provides mechanical protection for the transducers.

Figure 7:
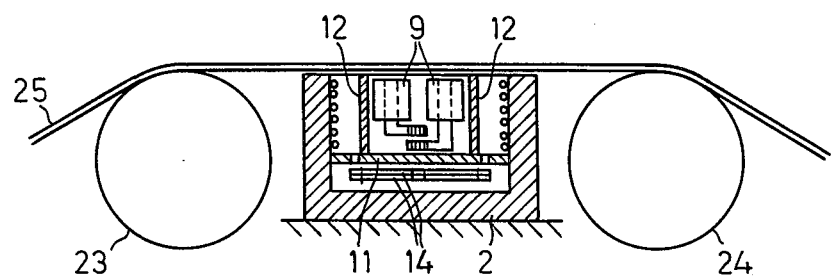
FIG. 7 shows a transducer of the shape meter arranged between two rolls of a strip tension measuring device.

Since the size of the air gap between the transducers and the strip affects the senstivity, it is of course desirable to keep this as constant as possible. The shape meter should therefore be placed between two parallel deflection rolls 23, 24 (FIG. 7) which are located as close to each other as possible so that the amplitude of oscillation of the strip 25 becomes negligible in relation to the size of the air gap. The shape meter is positioned with its open face close to a plane tangent to the two rolls. These deflection rolls can suitably consist of the rolls in a strip-tension measuring means. In any event, such a device is desirable for calibrating the sensitivity of the shape meter, since this varies with the quality of the material, the degree of reduction and the thickness of the material.

The signal processing may be performed, for example, as follows: Since the output signal from the individual transducers is very rich in harmonics at the relatively strong magnetization which provides the most nearly linear relation between tensile stress and output signal, and the fundamental tone has the most nearly linear connection with the tensile stress, the fundamental tone is selected. The signal from each transducer is filtered, amplified and rectified synchronously, whereafter the superimposed alternating voltage is filtered out. After this the average value of the direct voltage signals is formed, whereafter this average value is subtracted from the individual signals. The difference signal provides an uncalibrated picture of the stress distribution in the strip.

For calibration, changes in the average value signal are compared with changes in the average tensile stress $\sigma_0 = T/B \cdot t$, which is obtained from the strip tension measuring means signal $T$, the strip width $B$ and the strip thickness $t$. The two latter values may be set on a potentiometer, which is part of a simple scaling circuit.

One suitable way of performing the calibration may be to increase and decrease instantaneously the average tensile stress $\sigma_0$ by ± half the desired measuring range for the stress difference, that is ± 0.5 $(\Delta\sigma)_{max}$ and to change the magnetization current and/or the amplification gradually until the change in the average value signal corresponds to half the deflection of the strip shape instruments in the positive as well as in the negative direction.

As a typical example it can be assumed that the normal average tensile stress is 10 kp/mm². The average tensile stress can then suitably be changed repeatedly between the values 5 and 15 kp/mm², while at the same time changing the magnetization current and/or the amplification until the charge in the average value signal corresponds to half a deflection of the strip shape instruments for the various zones.

This method of calibration can be carried out before the rolling process itself has started, either manually or automatically.

I claim:

1. A magnetoelastic shape meter for cold-rolled strips of ferromagnetic material, comprising, in combination with a pair of parallel rolls, a beam positioned between said rolls and parallel thereto for mounting a plurality of magnetoelastic stress-sensing transducers, each transducer comprising two U-shaped magnetic cores provided with windings and crossing each other perpendicularly, said magnetic cores being arranged with their pole surfaces at a distance from the strip of ferromagnetic material and with said magnetic cores forming an angle of 45° with the longitudinal axis of said strip, one magnetic core being excited by alternating current for inducing a magnetic field in said strip and the other magnetic core being arranged to sense an asymmetry in said magnetic field caused by tensile stresses in said strip, wherein adjacent transducers have their excited cores rotated 90° with respect to each other, and said shape meter including means for screening the individual transducers from each other and comprising a screen of magnetic material positioned axially symmetrically around each transducer to prevent the adjacently positioned transducers from magnetically affecting each other, other than through the field in said strip and the leakage field in said strip and the leakage field in the air gap between said transducers and said strip.

2. A shape meter according to claim 1, wherein said plurality of transducers are of odd number and evenly distributed along a number of rods which are articulately joined to each other in pairs at the midpoint and ends of the rods, said transducers being fixed to said midpoints and the middle transducer also being fixed to said beam.

* * * * *